Dec. 19, 1967    A. E. McGLINCHEY    3,358,348
METHOD OF ASSEMBLING A TRUSS JOINT
Filed June 14, 1965    5 Sheets-Sheet 3
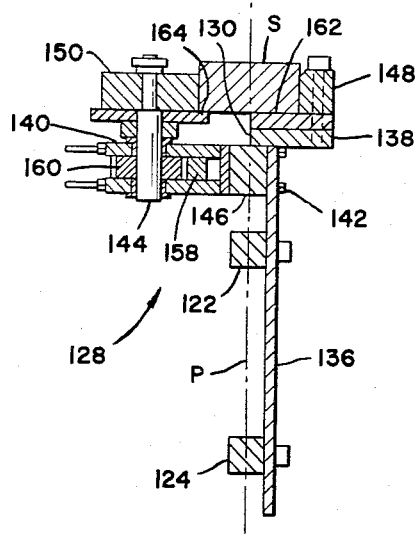
FIG_6
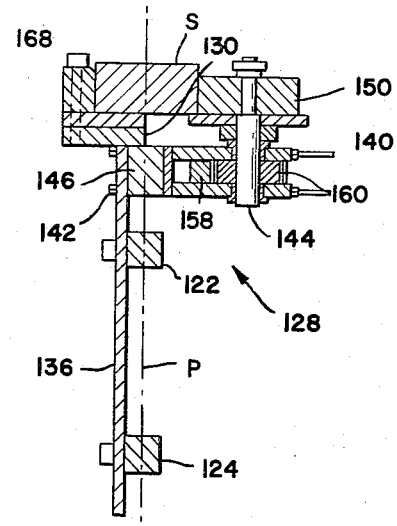
FIG_7
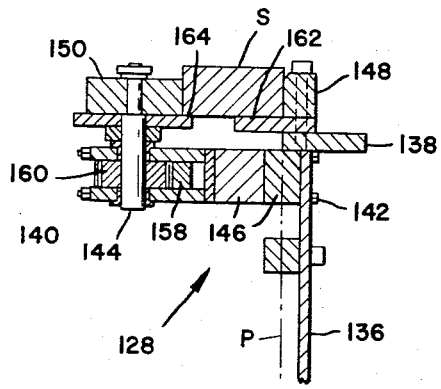
FIG_8
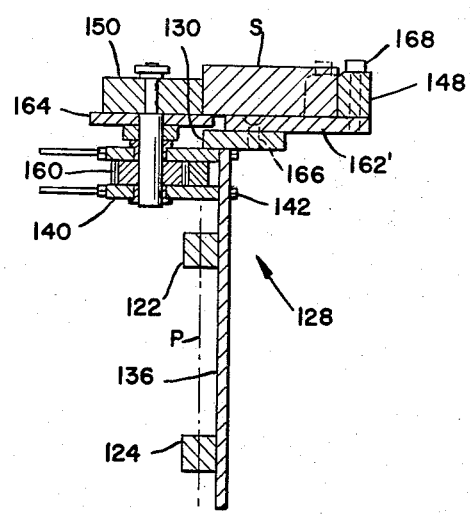
FIG_9
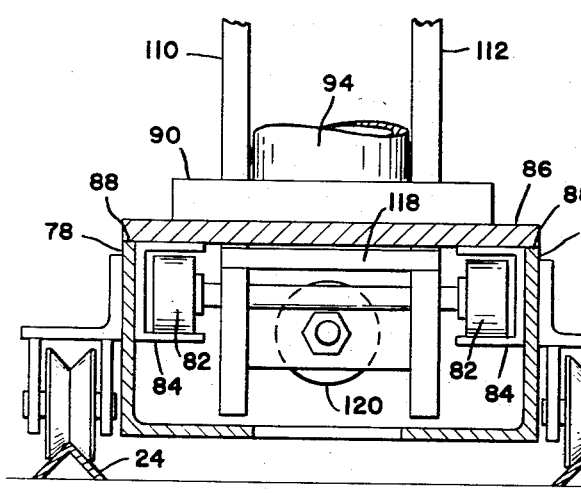
FIG_3
INVENTOR.
ARTHUR E. McGLINCHEY
BY
Mellin, Moore + Weissenberger
ATTORNEYS

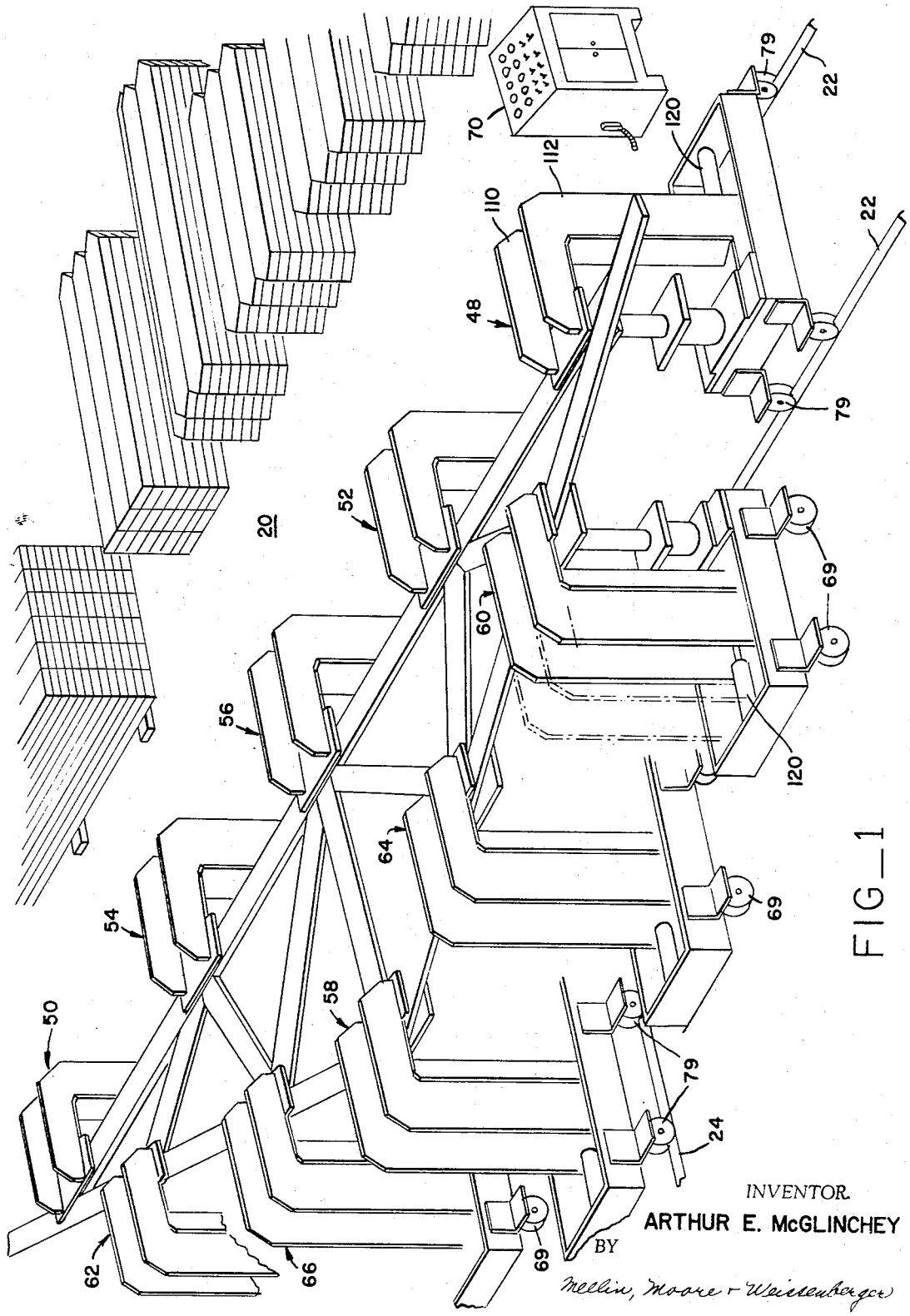
FIG_1

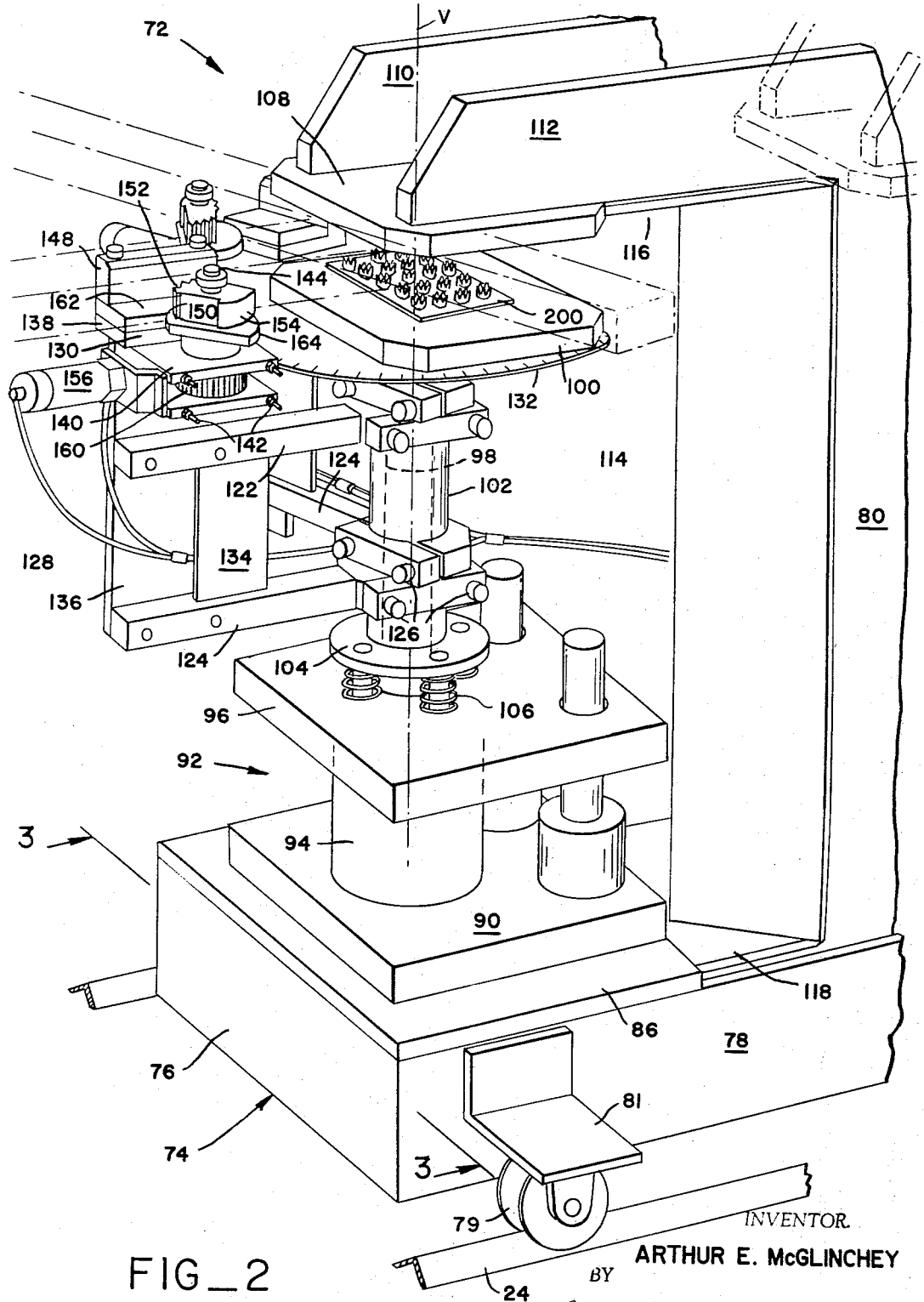

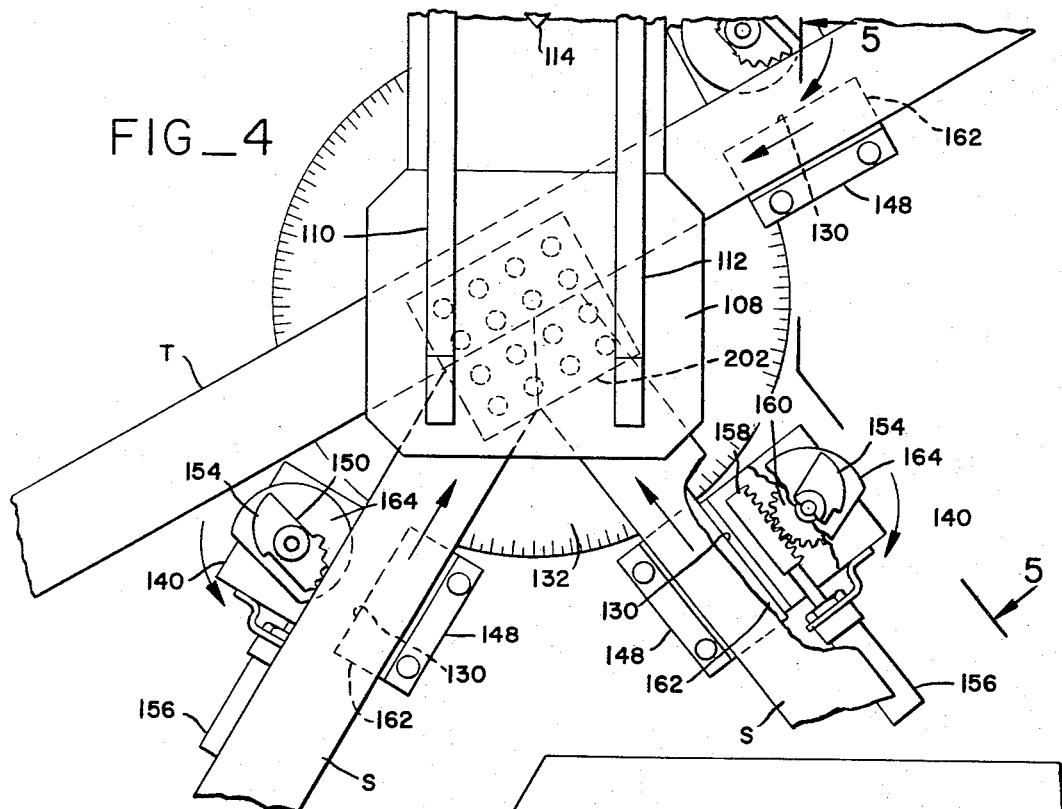
FIG_4
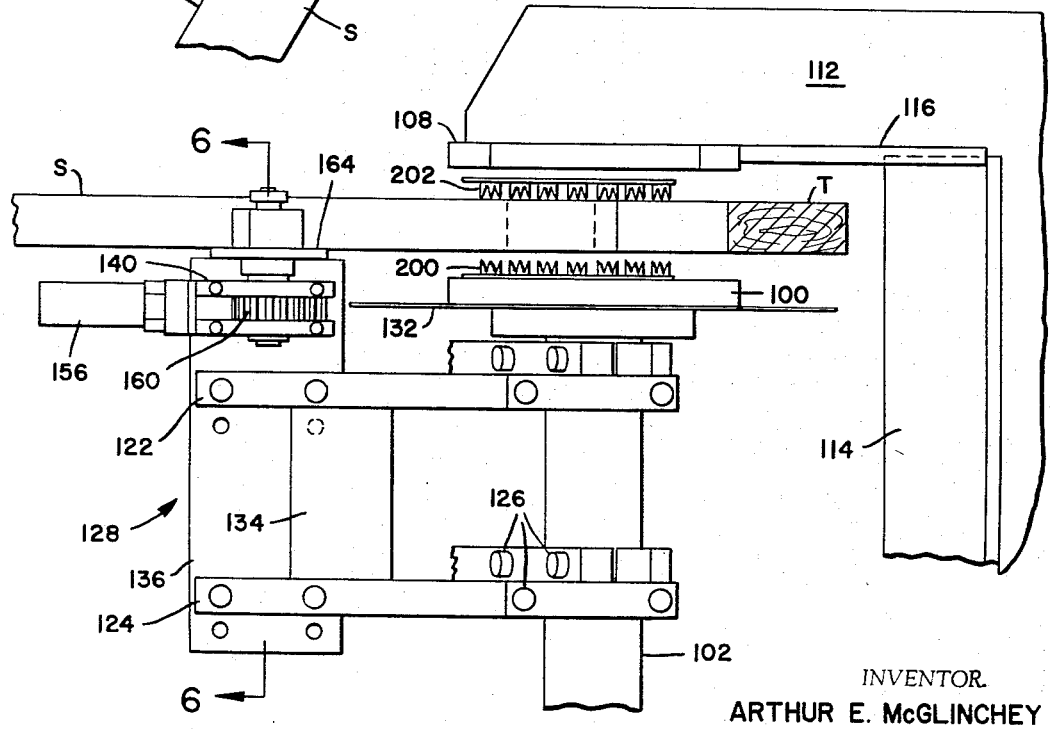
FIG_5
INVENTOR.
ARTHUR E. McGLINCHEY
BY
Mellin, Moore + Weissenberger
ATTORNEYS

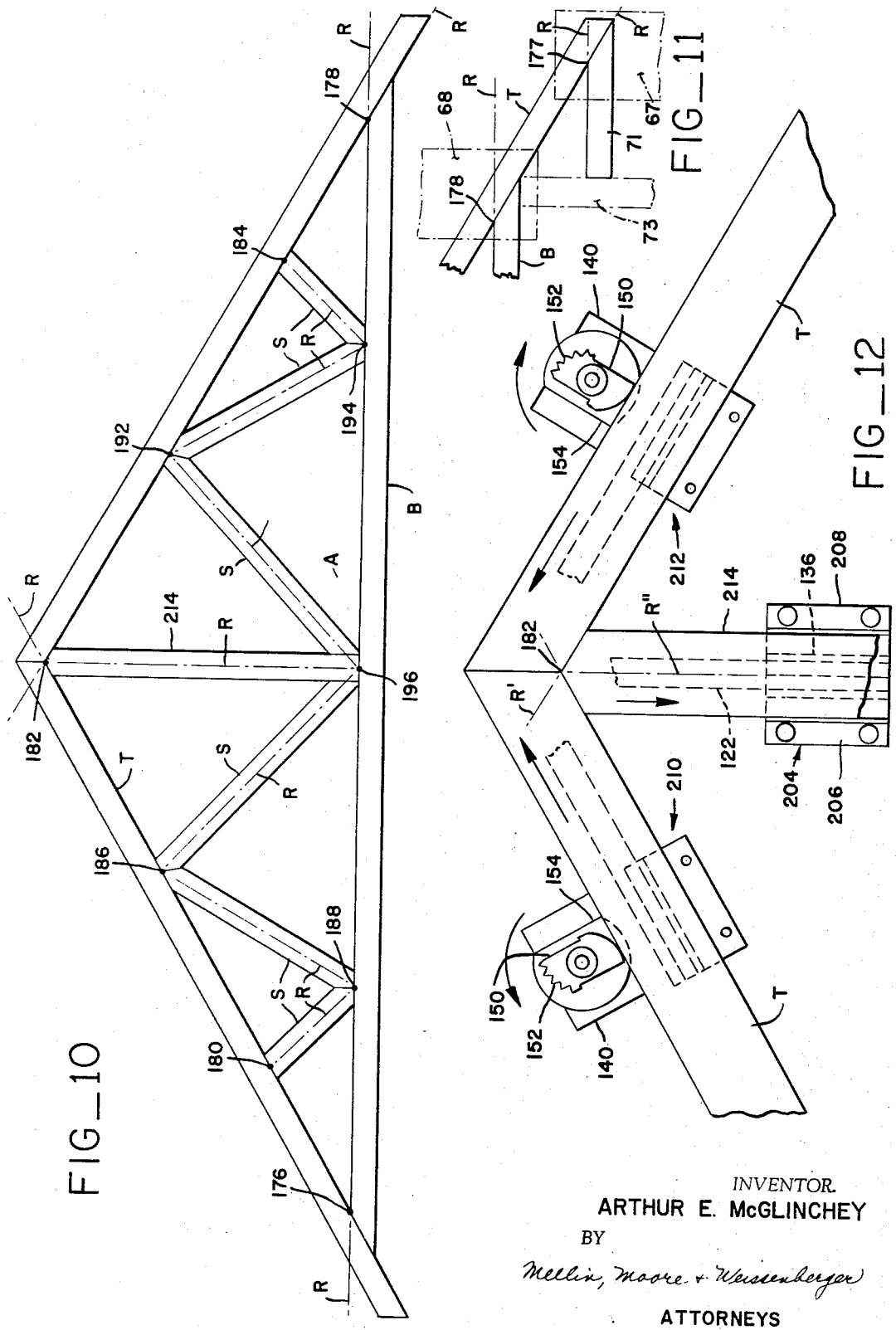

United States Patent Office 3,358,348
Patented Dec. 19, 1967

3,358,348
METHOD OF ASSEMBLING A TRUSS JOINT
Arthur E. McGlinchey, Columbus, Ohio, assignor to Idaco Engineering and Equipment Co., a division of Idaco Company, Oakland, Calif., a corporation of California
Filed June 14, 1965, Ser. No. 463,566
4 Claims. (Cl. 29—155)

ABSTRACT OF THE DISCLOSURE

A method of assembling a truss joint wherein each truss member is supported at points away from its joint end to allow free movement only along a line intersecting the lines of all other truss members to be joined at a common point, each truss member is gripped at these points of support, and movement is imparted along the lines to bias the truss members into compressive engagement with one another, the truss members being connected together while so biased.

---

This invention relates to truss assembling machines and more particularly to truss assembling machinery which is particularly versatile and capable of assembling wooden trusses of any shape or size without modification of the equipment.

In recent years, spiraling construction costs have caused builders to turn more and more toward prefabrication of major subassemblies of structures so as to facilitate assembly of the structures on the site. In particular, prefabrication of roof trusses has become quite commonplace, and diverse automatic machinery for preassembling such trusses has been on the market for some time.

With the demand for individuality in the design of homes, there has been a significant trend toward offering the buyer a large number of alternative designs in the subdivisions of a single builder. This fact, and also the fact that preassembly of roof trusses is becoming more commonplace in larger structures such as business buildings, has made it desirable to provide the manufacturers of preassembled roof trusses with versatile assembling machinery capable of handling, with a minimum of change, almost any size and design of truss which a customer may order.

The basic concept underlying the present invention is the recognition that any truss can be mathematically defined as an assembly of members parallel to theoretical reference lines forming a network in which the reference lines intersect at a common point at each joint of the truss. Utilizing this mathematical relationship, the present invention provides a system using independently movable joint assembling heads all of which can be substantially identical and yet capable of being positioned to accurately assemble any possible truss design, large or small, symmetrical or asymmetrical, which can fit within the building in which the heads are housed.

The system of this invention achieves the aforesaid result by providing independently movable assembling heads, each of which has a vertical operating axis corresponding to one of the points of intersection of the mathematical reference lines of the truss. By appropriately positioning the heads with respect to a system of mathematical coordinates (e.g., longitudinally and transversely of the building), each head can be positioned in a precisely determinable position in which its operating axis will exactly coincide with an intersection point of the center lines of the truss to be assembled. Each of the heads is equipped with a plurality of clamps pivotable about the operating axis and circumferentially positionable about the operating axis to define the angle of incidence of a given reference line (and hence of the truss member corresponding thereto). The clamps are also movable tangentially to define the predetermined lateral offset of the truss member with respect to its reference line.

It is therefore an object of this invention to provide an effective method of assembling a truss joint, which method is adaptable for use in assembling trusses of various shapes and designs.

This and other objects of the invention will become apparent from a perusal of the following specification taken in connection with the accompanying drawings in which:

FIG. 1 is a perspective, partially schematic view showing the layout of a truss assembling operation utilizing the apparatus of this invention.

FIG. 2 is a perspective view of one of the assembly heads used in the system of FIG. 1.

FIG. 3 is a fragmentary vertical section along line 3—3 of FIG. 2.

FIG. 4 is a fragmentary plan view of the head of FIG. 2, but with the clamps disposed for assembly of a different joint than in FIG. 2.

FIG. 5 is a fragmentary side elevation as indicated by line 5—5 of FIG. 4.

FIG. 6 is a vertical section along line 6—6 of FIG. 5.

FIG. 7 is a view similar to FIG. 6 but with the clamp reversed on its supporting arms.

FIG. 8 is a view similar to FIG. 6 but showing the truss member laterally displaced from its reference line to the maximum extent.

FIG. 9 is a view similar to FIG. 8 but showing the truss member laterally displaced in the opposite direction to the maximum extent.

FIG. 10 is a plan view of a typical truss.

FIG. 11 is a fragmentary plan view illustrating another type of truss.

FIG. 12 is an enlarged fragmentary plan view illustrating the assembly of the top joint of the truss.

Basically, the assembly of a truss with the system of this invention is begun by mathematically determining the reference line diagram of a truss to be assembled (dot-dash lines in FIG. 10). This is done by representing the members of the truss by single lines and arranging them in such a manner that the reference lines representing the various truss members intersect at single common junction points. Inasmuch as the various truss members have a substantial physical width, the position of the actual truss members with respect to these theoretical reference lines is then determined. For example, in the top junction illustrated in FIG. 12, the reference lines R' of the two chords T coincide with the bottom edges of the chord members, whereas the stud S is centered with respect to its reference line R''.

The reference line diagram having been determined, an assembling head according to this invention is positioned with its vertical operating axis in precise coincidence with each of the junction points of the reference line diagram. With the heads in place, the angles of incidence of the various truss members are then determined from the reference line diagram, and the clamp arms on all the heads are positioned to define the required angles. The clamp arms are then secured, and the clamp block elements are tangentially transposed as dictated by the widths of the truss members to be assembled and their offset from the reference lines.

Having performed these simple adjustments on the apparatus of this invention, the individual pre-cut truss members can be placed into position and will be accurately assembled by closing all the clamps and operating the assembling heads to drive nail plates into the truss members at all the joints. It will be noted that the particular eccentric construction of the clamping cams results in a stress application to the truss members which effectively prestresses the joints. In addition, the truss as a whole can be prestressed by stressing its top in accordance with the arrangement of FIG. 12.

Referring now to FIG. 1, the floor of an appropriate building housing the system of this invention is generally designated as 20. In a preferred embodiment of the invention tracks 22 may be laid along one long side of the floor 20. By mounting the heads 48 through 56 associated with the bottom chord joints 176, 178, 194 and 196 (FIG. 10), respectively, for movement of these tracks, their positioning is facilitated because only their longitudinal position has to be adjusted for any given truss design. This is so because normally, the bottom chord joints of a truss are all longitudinally aligned.

Likewise, tracks 24 may be laid perpendicularly to tracks 22 in a longitudinally central position and extending substantially throughout the short dimension of the area 20. By mounting head 58 corresponding to the top joint 182 on the tracks 24, it need be positioned only in a transverse direction. This is true because no matter what the truss design may be, it is always possible to so position the truss longitudinally that its top joint is longitudinally aligned with tracks 24.

The remaining heads 60 through 66 (and 67 and 68 in FIG. 11) are preferably mounted on omnidirectional lockable casters 69 so that they can be moved in any direction.

As an example of the versatility of the system of this invention, FIG. 11 shows a truss with a re-entrant end 71 (which, in the finished structure, abuts against a wall 73). In assembling such a truss, the head 50 is omitted (because it would interfere with member 71) and is replaced by caster-supported heads 67 (at joint 177) and 68 (at joint 178).

If central operation of the heads is desired, it will be understood that hydraulic and air pressure may be supplied to the heads through appropriate pressure lines (not shown) from a central control console 70 from which the heads may be operated singly or together by well-known control techniques.

Turning now to FIG. 2, a typical assembling head, which can be any of the heads of 48 through 68, is designated as 72. The head 72 has a basic rectangular frame 74 consisting of end pieces 76 and lateral angle members 78. Wheels 79 may be mounted by means of brackets 81 either on angle members 78, as shown in FIG. 2, or on end pieces 76 as shown on head 48 in FIG. 1, depending on whether the head 72 is to run on transverse tracks 24 or on longitudinal tracks 22. Alternatively, omnidirectional casters 69 (FIG. 1) or swivel-mounted wheels (not shown) may be mounted.

A C-shaped overhead member 80 (FIG. 2) is supported by wheels 82 (FIG. 3) rolling on the lower flanges of channels 84 fastened to the angle members 78. A mounting plate 86 is horizontally supported on the front ends of the upper edges 88 of the angle members 78 and supports the bottom plate 90 of a die set 92 (FIG. 2).

A hydraulic jack 94 extends between the lower plate 90 and the upper plate 96 of the die set 92 and is capable of reciprocating the upper plate 96 in a vertical direction with a force of preferably about fifty tons.

Mounted on the upper plate 96 of the die set 92 is a shaft 98 which supports the lower nail plate die 100. Surrounding the shaft 98 is a concentric sleeve 102 terminating in an annular flange 104 which is supported by the upper plate 96 of the die set 92 on springs 106.

The top nail plate die 108 is supported by the C-shaped overhead member 80 which consists preferably of a pair of spaced C-shaped plates 110, 112. The plates 110, 112 are structurally united by a V-shaped bracing member 114 and by brace plates 116, 118. The V-shaped brace plate is shaped and positioned (FIG. 4) to provide the most forward possible support for the plates 110, 112 without getting in the way of truss members extending rearwardly at the greatest normally encountered angle and with the greatest possible rearward offset.

The C-shaped overhead member 80 is movable in a forward and rearward direction by means of an air cylinder 102 (FIGS. 1 and 3). This enables the overhead member 80 to be positioned out of the way (phantom lines in FIGS. 1 and 2) while the truss members are being placed into position and the finished truss is removed, and to be placed into its operative (forward) position when the truss is ready for assembly. The lower brace plate 118 has a slight celarance as it slides underneath the mounting plate 86 (FIG. 3) on the forward movement of the member 80. When the hydraulic jack 94 is then operated, the entire member 80 is lifted up as the nail plate dies 100, 108 come together until the bottom brace plate 118 engages the underside of mounting plate 86 and prevents further upward movement of the overhead member 80. Continued rising movement of the bottom nail plate die 100 then results in forcing both the upper and lower nail plates into the wooden truss members disposed between them.

A plurality of clamp supporting arms 122, 124 are mounted on the sleeve 102. It will be understood that although FIG. 2 shows only two lower arms 124 and two upper arms 122, there may be as many as five upper arms and five lower arms, depending on how many truss members meet at the joint which the head 72 under consideration is called upon to assemble. It will be seen that the arms 122 and 124 can be pivoted about the sleeve 102 by loosening the set screws 126 and rotating the arms as desired. The angle of each of the clamp structures generally designated as 128 is adjusted by pivoting that clamp structure about sleeve 102 until the index edge 130 of the clamp structure 128 is opposite the appropriate angle marking on the protractor 132 carried by the lower nail plate die 100.

Each corresponding pair of arms 122, 124 is held at a proper spacing by a connecting plate 134 welded to both of them, and the clamp structure 128 can be attached to the arms 122 and 124 on either side thereof by the mounting plate 136. The mounting plate 136 carries at its top the guide support 138 whose inner edge 130 is the index edge previously described. It will be understood that the mounting plate 136 is provided with several sets of holes so as to make it possible to position all guide supports 138 at the correct height regardless of the vertical position of the arm set 122, 124 to which the mounting plate 136 is attached.

On one side and immediately underneath the guide support 138, the mounting plate 136 carries a clamp block 140 whose construction is shown in more detail in FIGS. 4 through 9. The clamp block 140 is secured to the mounting plate 136 by bolts 142 which are so positioned that the clamp block 140 can be reversed end over end or side over side so as to permit rotation of the shaft 144 journaled in clamp block 140 in either a clockwise or counterclockwise direction as seen from the top of the head.

Spacers 146 may be used to displace the clamp block 140 in a direction tangential to the perimeter of protractor 132 in whatever amount is required by the width of the truss member to be assembled and by the lateral offset of the center line of the truss member from the theoretical reference line representing it (see FIG. 10). (For example, in FIG. 10, the bottom chord B is fully offset downwardly so that its upper edge coincides with the reference line representing it; the top chords T are fully offset upwardly so that their bottom edges coincide with the reference lines representing them; and the studs S are centered with respect to the reference lines R representing them.) Likewise, the guide stop 148 is slidably mounted on the guide support 138 for limited adjustable movement in a direction tangential to protractor 132, for the same reasons.

It will be noted that the clamping cam 150, which can be mounted on either side of the clamp block 140 (depending on which way the block 140 is mounted) has a toothed eccentric end 152 and a smooth eccentric end 154 to carry out the various functions described below in connection with FIGS. 4 and 12. The clamping cam 150 can be operated in either a clockwise or a counterclockwise direction, depending on the position of clamp block 140, by an air cylinder 156 which operates a rack 158 and gear 160. It will be understood that during the clamping operation, the truss member being clamped rests on the supporting surfaces 162 and 164.

FIGS. 6 through 9 illustrate various positions of the clamping structure to accommodate various sizes of truss members, various offsets of the truss member from its reference line, and various directions of movement of the clamping cam during the clamping operation. Specifically, FIG. 6 shows the position of the clamp block and guide stop for clamping, e.g., a two-by-four stud S in a centered position with respect to the plane P in which its reference line R (FIG. 10) lies, for clamping movement toward the observer. FIG. 7 shows the arrangement of the parts for the same stud and the same clamping movement, but with the clamping cam positioned on the other side of the stud. The choice of side is usually dictated by the space available, as best shown in FIG. 4. FIG. 8 shows an arrangement like FIG. 6 but for a stud fully offset to the left; and FIG. 9 shows a similar arrangement for, e.g., a two-by-eight stud (full lines) and a two-by-six stud (phantom lines) fully offset to the right. In that case, it will be noted that a larger supporting plate 162' must be used, which is fastened to the guide support 138 by separate screws 166 rather than, as in FIGS. 6 through 8, by the guide stop bolt 168.

In all of these figures, the clamping movement of the stud is toward the observer, because the rack 158 is between the gear 160 and the mounting plate 136. The opposite movement can be achieved in each instance if desired by reversing the block 140 so that the rack 158 is on the outer side of gear 160. It will be noted that in all positions of the clamping structure 128, the index edge 130 of the guide support 138 is exactly in the plane P of the reference line R.

*Operation*

The operation of the system of this invention is as follows:

First, a truss to be constructed is laid out on paper to scale. The reference line representation of the truss as shown in FIG. 10 is then worked out, and the precise mathematical co-ordinates of each of the junction points 176 through 196 is then determined.

A number of heads 72 corresponding to the number of junction points are then provided. In the example of FIG. 10, five heads corresponding to junction points 176, 188, 196, 194 and 178 are placed with their wheels 79 on tracks 22; one head corresponding to junction point 182 is placed with its wheels 79 on tracks 24; and four heads are placed with their casters 69 on the floor 20.

The heads are then positioned along their respective tracks and on the floor (preferably with the aid of appropriate markings laid out on the floor) until the vertical operative axis V (FIG. 2) of each head 72 is precisely located at one of the junction points 176 through 196 (FIG. 10). The wheels 79 or casters 69 are then locked. The angles (such as A) formed by each of the reference lines R of the reference line diagram in FIG. 10 with bottom chord B are then determined from the diagram, and the clamp structures 128 of each head are rotated about their respective pivot sleeves 102 until their index edges 130 are opposite the appropriate angles A on the protractor 132, as best shown in FIG. 4.

At junction 196, in the example of FIG. 10, five clamp structures 128 would be used, and their index edges 130 would be set respectively at 0°, 42½°, 90°, 137½° and 180°, these being the angles, such as A, made by the reference lines R with the bottom chord B. In view of the force relationships involved, the guide stops 148 on the 0° and 42½° clamp would preferably be on the clockwise side of the clamping cam (space permitting); in the 137½° and 180° clamps, the guide stop should preferably be on the counterclockwise side of the clamping cam, and on the 90° clamp it does not matter. The clamping direction for each of the strut clamping cams at junction 196 is set so that the truss member associated therewith is pushed toward the junction 196; and the clamping blocks and cams for the bottom chord B are preferably omitted, as they would serve no useful purpose.

FIG. 12 illustrates the arrangement of the clamping structures at the top joint 182. Since it is desired to stress the truss from the top to whatever extent the stressing movement of the clamps at point 196 (FIG. 10) permits, an arrangement such as that shown in FIG. 12 may be used. In FIG. 12, the 90° clamp structure 204 has been provided with two guide stops 206, 208 and no cam. The 30° and 150° clamp structures 210 and 212 have been arranged so that the smooth eccentric end 154 of clamping cam 150 engages the truss members T, and the guide stops 148 have been omitted on the clamps 210 and 212. If the clamping cams of clamps 210 and 212 are now actuated in the direction of the curved arrows, they will push the chords T and stud 214 in the direction indicated by the straight arrows to whatever extent the sliding movement of strut 214 between guides 206, 208 toward point 196 (FIG. 10) will permit. The resulting interaction of the head at point 182 and the head at point 196 will result in a firm prestressing of the truss of FIG. 12 without any movement of any of the heads 72. It will be apparent that the same principle can be used at points 180, 186, 192 and 184.

With all the heads now properly positioned and the clamping structures properly adjusted, lower nail plates 200 are placed in a centered position on the lower nail plate die 100, with the prongs on the nail plate 200 facing up (FIG. 5). The position of the lower nail plate die 100 at this point is such that the upper extremities of the prongs of the nail plate 200 are below the plane defined by the supporting surfaces 162 (FIG. 4), 164 of the clamps.

The truss members to be joined are now placed into the positions which they will occupy in the finished truss. It will be understood that the C-shaped overhead member 80 is at this point in its rearwardmost position (phantom lines in FIGS. 1 and 2), and that the truss members rest on the supporting surfaces 162, 164 of the clamps. When all the truss members are in place, upper nail plates 202 are placed prongs down on top of the truss members at the joint, directly above the corresponding lower nail plates 200.

The pneumatic cylinders 120 (FIGS. 1 and 3) are now actuated to move the C-shaped overhead members 80 into their forward position (full lines in FIGS. 1 and 2). The upper nail plate die 108 is sufficiently high so that its lower surface just clears the upper nail plates 202 lying on top of the truss members.

The hydraulic jacks 94 are now energized to raise the upper plates 96 of the die sets 92. This causes the lower nail plate die 100 and the clamps with the truss members supported thereon to rise until the upper nail plates 202 come into contact with the upper nail plate dies 108. At this point, the upper nail plates 202 lift the upper nail plate die and the C-shaped overhead member 80 upward until the bottom brace plate 118 contacts the underside of the mounting plate 86 (FIG. 3) and prevents the member 80 from rising any further. As the lower nail plate die 100 continues to rise, the upper nail plate 202 is forced into the wood of the truss members until it can go no further.

Continued rising of the lower nail plate die 100 then forces the lower nail plate 200 into the wood of the truss members. Since the truss members and the clamps can no longer rise during this latter movement, the annular flange 104 of sleeve 102 compresses the springs 106 to permit full rising of the lower nail plate die 100 without further upward movement of the truss members and the clamp structures.

When both nail plates 200, 202 have been firmly driven into the wood of the truss members, the hydraulic jack is released, the air cylinder 120 is operated to retract the C-shaped overhead member 80, and the finished truss can be lifted out of the machine by appropriate lifting equipment.

It will be seen that the inventive concept described above is capable of being carried out in many different ways, of which the embodiment illustrated and described herein is merely illustrative. Consequently, I do not desire to be limited in any way by the particular details of the embodiment shown and described herein, but only by the scope of the following claims.

What I claim and desire to secure by Letters Patent is:

1. The method of assembling a truss joint comprising the steps of supporting each truss member to be joined only at points spaced from its joint end for free movement only along a line intersecting the lines of movement of all the other truss members to be joined thereto at a common point, gripping said truss members at their points of support and imparting movement thereto along said lines to bias said members into compressive engagement with one another; and connecting said truss members together while thus biased.

2. The method of assembling a truss joint comprising the steps of supporting and guiding each truss member to be joined in a common plane and only at points spaced from its joint end for free movement only along a line intersecting the lines of movement of all the other truss members to be joined thereto at a common point, gripping said truss members at their points of support and imparting movement thereto along said lines to bias said members into compressive engagement with one another; and connecting said truss members together while thus biased.

3. The method of assembling a truss joint comprising the steps of supporting each truss member to be joined only at points spaced from its joint end for free movement only along a line intersecting the lines of movement of all the other truss members to be joined thereto at a common point, gripping said truss members at their points of support and imparting movement thereto along said lines to bias said members into compressive engagement with one another; and connecting said truss members together at said common point of intersection of said lines of movement while thus biased.

4. The method of assembling a truss comprising the steps of supporting each truss member only at points spaced from its ends and in a position substantially identical to its position in the assembled truss; restraining at least some of said truss members against movement except in directions longitudinal thereof; gripping said truss members at their points of support and imparting movement thereto into compressively stressed assembled relationship; and connecting said truss members together while in said compressively stressed assembled relationship.

References Cited
UNITED STATES PATENTS

| | | | |
|---|---|---|---|
| 1,132,052 | 3/1915 | Wattmann | 29—446 |
| 1,803,070 | 4/1931 | Pawling | 29—155 |
| 3,238,867 | 3/1966 | Jureit et al. | 100—214 |

THOMAS H. EAGER, *Primary Examiner.*